US008626239B2

(12) United States Patent
Sagae et al.

(10) Patent No.: US 8,626,239 B2
(45) Date of Patent: Jan. 7, 2014

(54) RANDOMLY VARYING A DISTRIBUTION ORDER OR TRANSMISSION POWER OF CONTROL INFORMATION FROM A BASE STATION

(75) Inventors: Yuta Sagae, Kawasaki (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 372 days.

(21) Appl. No.: 12/993,734

(22) PCT Filed: Apr. 30, 2009

(86) PCT No.: PCT/JP2009/058511
§ 371 (c)(1),
(2), (4) Date: Feb. 2, 2011

(87) PCT Pub. No.: WO2009/142105
PCT Pub. Date: Nov. 26, 2009

(65) Prior Publication Data
US 2011/0183703 A1    Jul. 28, 2011

(30) Foreign Application Priority Data
May 19, 2008    (JP) ................................ 2008-131374

(51) Int. Cl.
*H04W 88/08*    (2009.01)
(52) U.S. Cl.
USPC ............................ 455/561; 455/434; 455/522
(58) Field of Classification Search
None
See application file for complete search history.

(56) References Cited

U.S. PATENT DOCUMENTS

| 6,256,509 B1 * | 7/2001 | Tanaka et al. ................. 455/434 |
| 2006/0089141 A1 | 4/2006 | Ho et al. |
| 2006/0116154 A1 | 6/2006 | Han |

FOREIGN PATENT DOCUMENTS

| EP | 1 784 041 A1 | 5/2007 |
| EP | 10784 041 A1 | 5/2007 |
| EP | 1 983 665 A1 | 10/2008 |
| JP | 1 227534 | 9/1989 |
| JP | 2005-210709 | 8/2005 |
| JP | 2007 13344 | 1/2007 |
| JP | 2007-214820 | 8/2007 |
| WO | WO 02/054617 A2 | 7/2002 |
| WO | WO 2004/077685 A2 | 9/2004 |
| WO | 2007 129541 | 11/2007 |

OTHER PUBLICATIONS

Perez-Romero, J., et al., "A Novel On-Demand Cognitive Pilot Channel enabling Dynamic Spectrum Allocation," New Frontiers in Dynamic Spectrum Access Networks, Dyspan, 2$^{nd}$ IEEE International Symposium, pp. 46-54, (Apr. 17, 2007).

(Continued)

*Primary Examiner* — Philip Sobutka
(74) *Attorney, Agent, or Firm* — Oblon, Spivak, McClelland, Maier & Neustadt, L.L.P.

(57) ABSTRACT

A base station apparatus includes a transmitting unit which transmits control information with an area as a unit, which area is in multiple numbers and each of which area is divided from a coverage area; a storing unit which stores control information corresponding to the divided area; and a determining unit which determines an order of distribution for each of the divided areas. The determining unit includes either or both of a unit which randomly determines the order of distribution for each of the divided areas and a unit which determines an order of distribution for distributing the same information with another base station apparatus.

13 Claims, 19 Drawing Sheets

(56) References Cited

OTHER PUBLICATIONS

Martigne, P., et al., "An alternative concept to scanning process for cognitive radio systems: technical and regulatory issues," Mobile and Wireless Communications Summit, 16$^{th}$ IST, total 5 pages, (Jul. 1, 2007).

International Search Report issued Jun. 23, 2009 in PCT/JP09/058511 filed Apr. 30, 2009.

Extended European Search Report issued Jul. 3, 2012, in European Patent Application No. 09750467.4.

Office Action mailed Aug. 6, 2013, in Japanese Patent Application No. 2012-268692 (with English-language Translation), 5 pages.

Extended Search Report mailed Sep. 30, 2013, in European Patent Application No. 13177819.3.

Extended European Search Report mailed Sep. 24, 2013, in European Patent Application No. 13177818.5.

* cited by examiner

RANDOMLY VARYING A DISTRIBUTION ORDER OR TRANSMISSION POWER OF CONTROL INFORMATION FROM A BASE STATION

BACKGROUND OF THE INVENTION

1. Field of the Invention

The present invention is related to apparatuses which handle a control signal for the whole radio system operated at each region that include a common control channel.

2. Description of the Related Art

A cognitive pilot channel (CPC) is being proposed in which is distributed, to the whole radio system operated at each of regions, information including a frequency and a radio scheme which are utilized within each of the regions. The cognitive pilot channel may be applied to eliminate a process of scanning basic parameter information of a radio system to which a terminal apparatus can connect to. Moreover, applying the cognitive pilot channel allows for changing apart of parameters of a radio system by changing the above-described information distributed. Furthermore, the cognitive pilot channel may be applied without changing the terminal apparatus itself.

Therefore, adopting the present technique makes it possible to decrease a price of the terminal apparatus and to deal with changing a radio system parameter. Moreover, as it is made possible to deal with changing the radio system parameter, it is possible to expect an easy transition to a radio system with a high frequency utilization efficiency. In the present technique, a coverage area of a base station apparatus is divided into multiple meshes. In the coverage area of the base station apparatus, a control signal is transmitted. Then, in units of the meshes as described above, a method of utilizing a radio resource is reported over multiple times. Information reported may be the same. FIG. 1 shows a downlink broadcast cognitive pilot channel. In an example shown in FIG. 1, a coverage area of a base station is divided into $N_m$ meshes, where $N_m$ is an integer greater than 1. In each of the meshes, control information is continually transmitted on a periodic basis. When the cognitive pilot channel is detected, the terminal apparatus waits until control information is transmitted which corresponds to a mesh at which the terminal apparatus resides. A total time ($T_{m,B}$) over which the control information is transmitted at each of the meshes depends on a bit rate at which a downlink broadcast cognitive pilot channel is transmitted. The $T_{m,B}$ includes multiple time slots shown with Ts. In this way, the terminal apparatus may synchronize with all information sequences transmitted in the channel.

Non-Patent Document 1

J. Perez-Romero, et al., "A Novel On-Demand Cognitive Pilot Channel enabling Dynamic Spectrum Allocation," IEEE Dyspan 2007.

SUMMARY OF THE INVENTION

Problems to be Solved by the Invention

However, a radio network controller which distributes all radio system parameters as described in the above Background section has the following problems. For example, when distributing such a radio control signal, the terminal apparatus may not conduct communications utilizing each radio system being operated unless it may receive the control signal. Moreover, the terminal apparatus must provide sufficient communications quality in a region at which communications are provided utilizing the radio resource.

However, as the control signal is distributed in units of the meshes, a radio system being operated at the mesh or the radio parameter thereof may differ. In this case, the control signal may differ from one mesh in which distribution is conducted to another, causing the control signal to differ from one base station apparatus to another. Therefore, it is difficult to apply a technique for transmitting the same signal from all base station apparatuses of a single frequency network (SFN), etc., and to provide sufficient reception quality. For example, as shown in FIG. 2, a case is described of Cells #1 and #2 existing at which cognitive pilot channels are transmitted (below called CPC Cell #1 and CPC Cell #2) are transmitted. The CPC Cells #1 and #2 include multiple meshes. In such a case, as shown in FIG. 3, when a timing at which a cognitive pilot channel is transmitted in a Mesh #i included in the CPC Cell#1 overlaps with a timing at which a cognitive pilot channel is transmitted in a Mesh #j included in the CPC Cell #2 that neighbors the Mesh #i, the terminal apparatus receives a cognitive pilot channel which is always subjected to an interference signal having an equivalent reception power.

Moreover, allocating a wide bandwidth to a control signal is not preferable as an overhead increases. Therefore, one frequency-repeating operation is necessary which utilizes the same frequency in each base station apparatus. When considering the one frequency-repeating operation, it is mandatory to implement a sophisticated transmission and reception algorithm which yields a high reception quality in the terminal apparatus. However, it is difficult to implement the sophisticated algorithm for all terminal apparatuses utilizing a radio system which has been operated from before. Thus, it is preferable to provide the base station apparatus with the sophisticated transmission algorithm, which makes it possible to satisfy a sufficient reception quality even for a terminal apparatus which implements a simple reception algorithm.

Thus, the present invention is provided to solve the problems as described above, the object of which is to provide a base station apparatus, a radio network controller, a terminal apparatus and a method which make it possible to improve a reception quality in the terminal apparatus when the base station apparatus transmits control information with an area as a unit, wherein the area is in multiple numbers and each of the areas is divided from a coverage area.

Means for Solving the Problem

In order to solve the problem as described above, a base station apparatus of the present invention includes
a transmitting unit which transmits control information with an area as a unit, which area is in multiple numbers and each of which area is divided from a coverage area;
a storing unit which stores control information corresponding to the divided area; and
a determining unit which determines an order of distribution for each of the divided areas, wherein
the determining unit randomly determines the order of distribution for each of the divided areas.

Another base station apparatus of the present invention includes
a transmitting unit which transmits control information with an area as a unit, which area is in multiple numbers and each of which area is divided from a coverage area;
a storing unit which stores control information corresponding to the divided area; and
a control unit which controls a transmission power of the control information based on a position of the divided area.

A radio network controller of the present invention is a radio network controller which controls one or more base station apparatuses, wherein the base station apparatus distributes control information with an area as a unit, which area is in multiple numbers and each of which area is divided from a coverage area, the base station apparatus including:

a synchronizing unit which synchronizes the multiple base station apparatuses; and a control unit which performs a control such that, for a divided area which overlaps with a divided area covered by another base station apparatus out of divided areas covered by the respective base station apparatus, a timing of the distributing become the same with respect to the base station apparatuses which cover the overlapping divided areas.

A terminal apparatus of the present invention is a terminal apparatus in a communications system having a base station apparatus which transmits control information with an area as a unit, which area is in multiple numbers and each of which area is divided from a coverage area, wherein the base station apparatus determines a distribution order for the respective divided area on a random basis and transmits the control information multiple times, the terminal apparatus including:

a storing unit which stores the control information transmitted multiple times; and a synthesizing unit which synthesizes the control information transmitted multiple times.

Another terminal apparatus of the present invention is a terminal apparatus in a communications system having a base station apparatus which transmits control information with an area as a unit, which area is in multiple numbers and each of which area is divided from a coverage area, wherein the base station apparatus controls transmission power of the control information based on a position of the divided area and transmits the control information multiple times, the terminal apparatus including:

a storing unit which stores the control information transmitted multiple times, and a synthesizing unit which synthesizes the control information transmitted multiple times.

A method of the present invention is a method in a base station apparatus which transmits control information with an area as a unit, which area is in multiple numbers and each of which area is divided from a coverage area, the method including the steps of:

determining an order of distribution for each of the divided areas on a random basis; and transmitting control information corresponding to the divided area according to the order of distribution determined in the step of determining.

Another method of the present invention is

A method in a base station apparatus which transmits control information with an area as a unit, which area is in multiple numbers and each of which area is divided from a coverage area, the method including the steps of:

controlling a transmission power of the control information based on a position of the divided area; and transmitting control information corresponding to the divided area with the transmission power determined in the step of determining.

Advantage of the Invention

The present embodiments make it possible to provide a base station apparatus, a radio network controller, a terminal apparatus and a method which make it possible to improve a reception quality in the terminal apparatus when the base station apparatus transmits control information with an area as a unit, wherein the area is in multiple numbers and each of the areas is divided from a coverage area.

DESCRIPTION OF THE PREFERRED EMBODIMENTS

Figure 1:
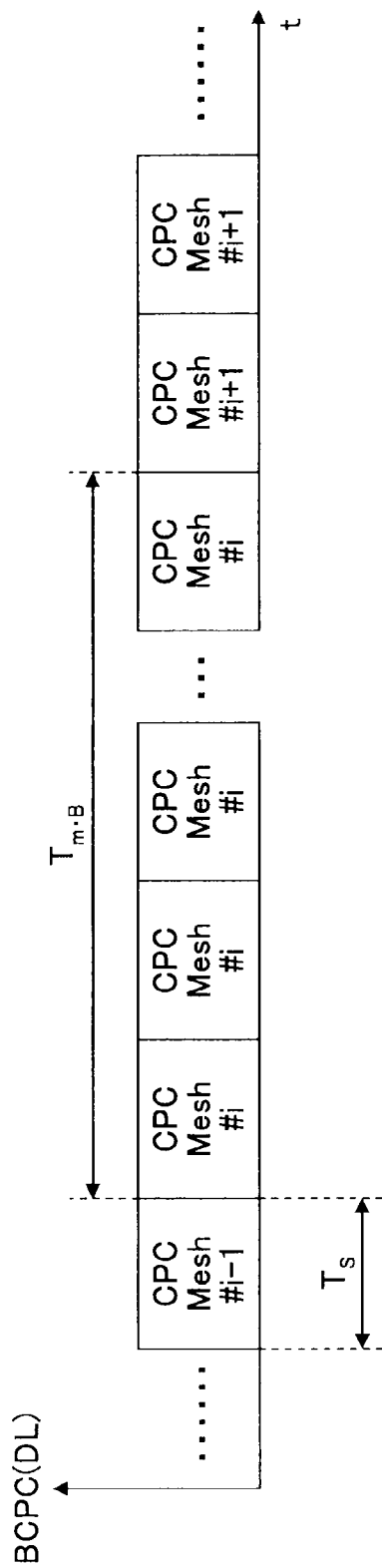
FIG. 1 is an explanatory diagram illustrating an exemplary distribution of a cognitive pilot channel.
Figure 2:
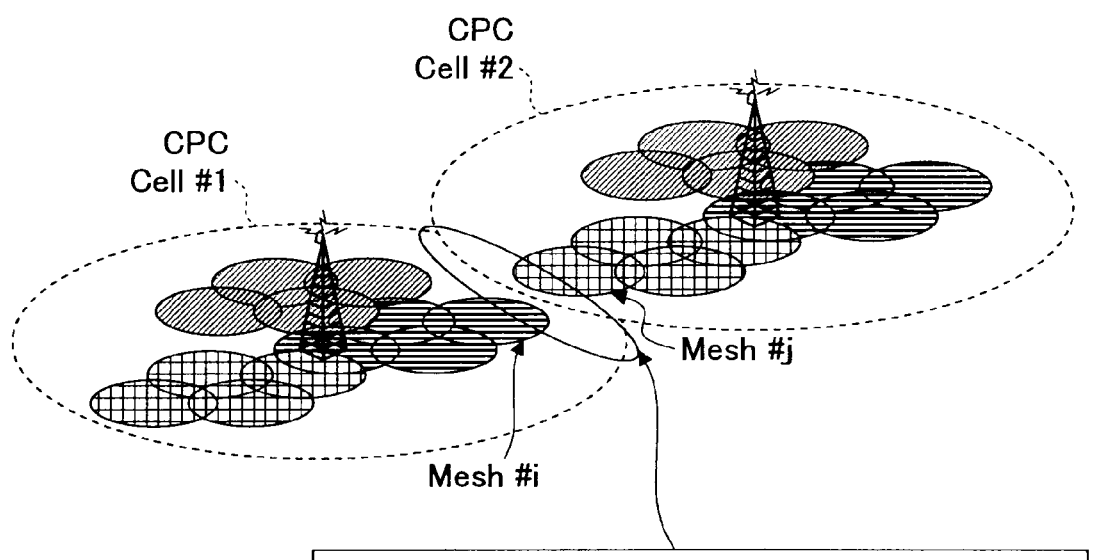
FIG. 2 is an explanatory diagram illustrating an example of a communications system.
Figure 3:
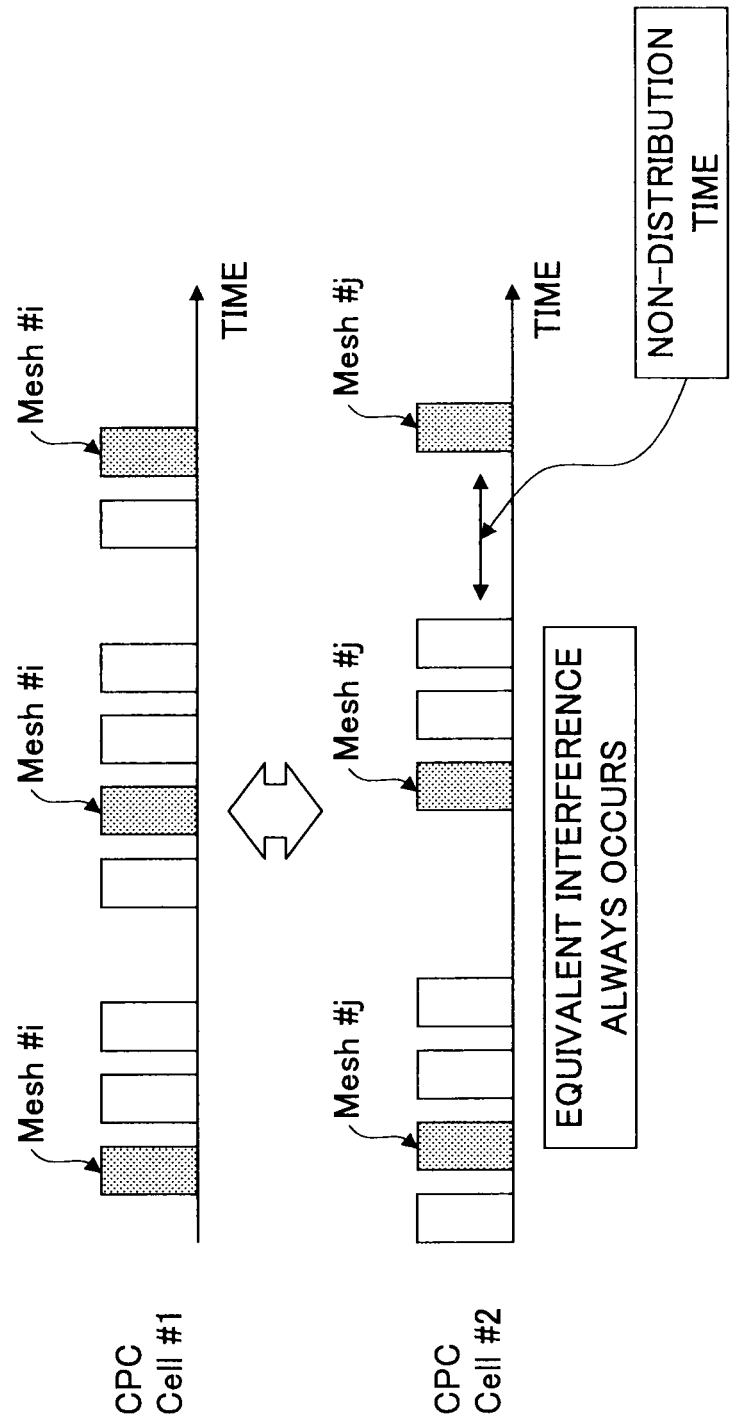
FIG. 3 is an explanatory diagram illustrating exemplary distribution of the cognitive pilot channel.

[Description of Notations]
  100 terminal apparatus
  102 received signal synthesis processor
  104 received signal storing unit
  106 synthesis process controller
  108 control signal processor
  200 ($200_1$, $200_2$) base station apparatus
  202 common control channel information database
  204 control channel transmitter
  206 transmission timing determining unit
  208 random number generator
  210 reference transmission power database
  212 mesh position database
  214 random number generator
  216 transmission power determining unit
  218 network timer synchronization controller
  220 GPS signal receiver 222 timer
224 time synchronization controller
226 transmission mesh information controller
300 radio network controller
302 timer
304 base station position information storing unit
306 transmission base station controller
308 common control channel information updating unit

BEST MODE OF CARRYING OUT THE INVENTION

With reference to the drawings, a description is given below with regard to embodiments of the present invention. Throughout the drawings for explaining the embodiments, same letters are used for those having the same functions, so that repetitive explanations are omitted.

A First Embodiment

Figure 4:
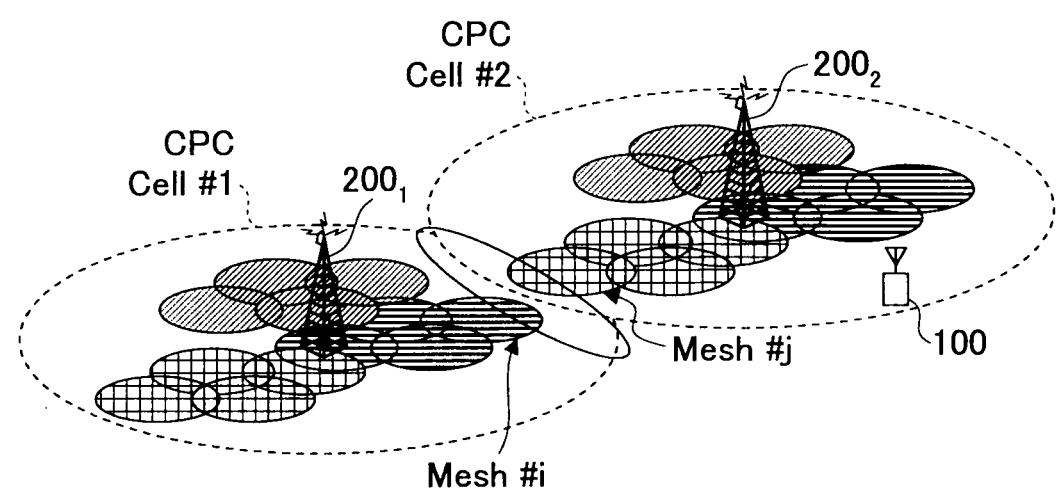
FIG. 4 is an explanatory diagram illustrating a communications system according to an embodiment.

A communications system according to the present embodiment is explained with reference to FIG. 4. The communications system according to the present embodiment includes base station apparatuses 200 ($200_1$, $200_2$). Moreover, the communications system according to the present embodiment includes a radio network controller. Furthermore, the communications system according to the present embodiment includes a terminal apparatus 100. Moreover, a function of the radio network controller may be arranged to be included in the base station apparatus. FIG. 4 shows two base station apparatuses, which may also be in three or more. Moreover, FIG. 4 shows one terminal apparatus, which may also be in two or more.

Each base station apparatus 200 covers a cognitive pilot channel cell (CPC Cell: Cognitive Pilot Channel Cell) (below called CPC Cell) as a region (an area) which distributes control information. Each CPC cell includes multiple meshes. A mesh is an area, wherein which area is in multiple numbers and each of which area is divided from a coverage area of the base station apparatus. In an example shown in FIG. 4, Mesh #i included in CPC Cell#1 and Mesh #j included in CPC Cell #2 are neighboring. Moreover, in the example shown in FIG. 4, meshes with the same hatching are covered by the same radio communications system. Here, the cognitive pilot channel is control information for each mesh. For example, the control information may be arranged to include control information of a radio communications system operated at the mesh.

Figure 5:
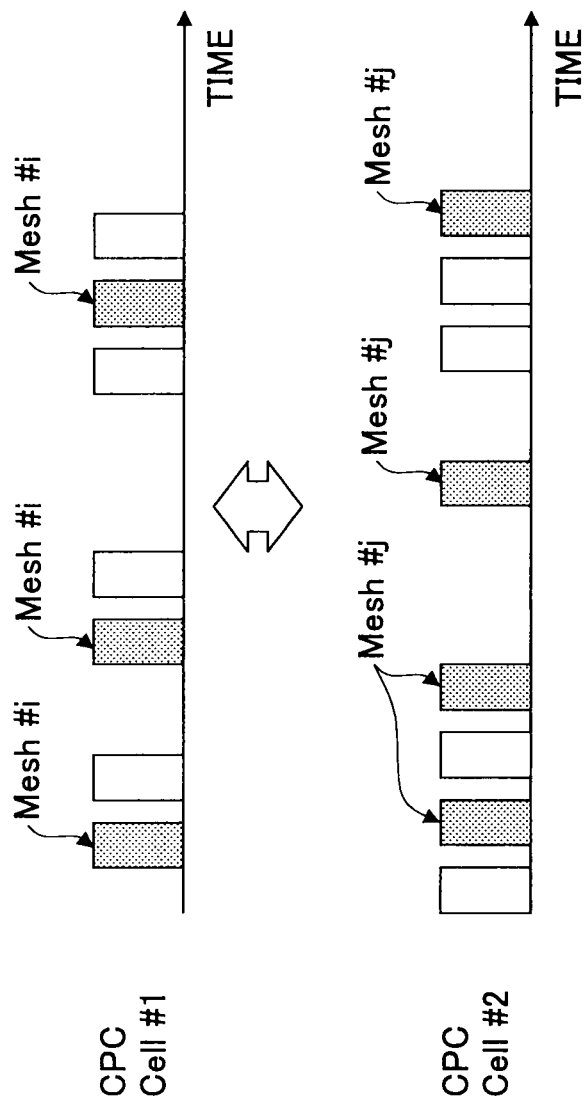
FIG. 5 is an explanatory diagram illustrating an operation of a base station apparatus according to an embodiment.

An order of a mesh in which control information is distributed by the base station apparatus 200 according to the present embodiment is described with reference to FIG. 5. The control information may be arranged to include a cognitive pilot channel. Moreover, the control information may be arranged to include a common control channel. FIG. 5 shows an example of an order of meshes in which the base station apparatus 200 performs distribution.

When distributing control information of each of the meshes, the base station apparatus 200 according to the present embodiment randomizes the order of the meshes to be transmitted in. In other words, each time the control information of each of the meshes is distributed, the base station apparatus 200 changes a time interval from a previous timing. In this way, changing the time interval from the previous timing rather than distributing the same control signal at equal time intervals reduces a probability that a timing at which control information is transmitted in Mesh #i included in the base station apparatus 200 and a timing at which control information is distributed in Mesh #j included in a CPC cell #2 neighboring the Mesh #i overlap. In other words, in a predetermined mesh in which the base station apparatus 200 distributes, it is arranged for a mesh in which a neighboring base station distributes at the same timing as a timing at which the base station apparatus 200 distributes to be different for each distribution.

In an example shown in FIG. 5, a time interval for distributing control information of Mesh #i in CPC Cell #1 is randomized. In this way, at a certain distribution timing, even when there is an overlap between a riming at which control information is transmitted in Mesh #i and a timing at which control information is transmitted in Mesh #j included in CPC Cell #2 which neighbors the Mesh #i, subsequent distribution timings may be varied. Thus, as interference distributed to Mesh #j which neighbors Mesh #i is reduced, reception quality may be improved for a terminal device 100 which is located at Mesh #i. In the example shown in FIG. 5, at a first transmission timing, a timing at which control information is transmitted in Mesh #i included in CPC Cell #1 overlaps a timing at which control information is transmitted in Mesh #j included in CPC Cell #2 which neighbors the Mesh #i, but timings at which the following control information sets are transmitted differ.

Figure 6:
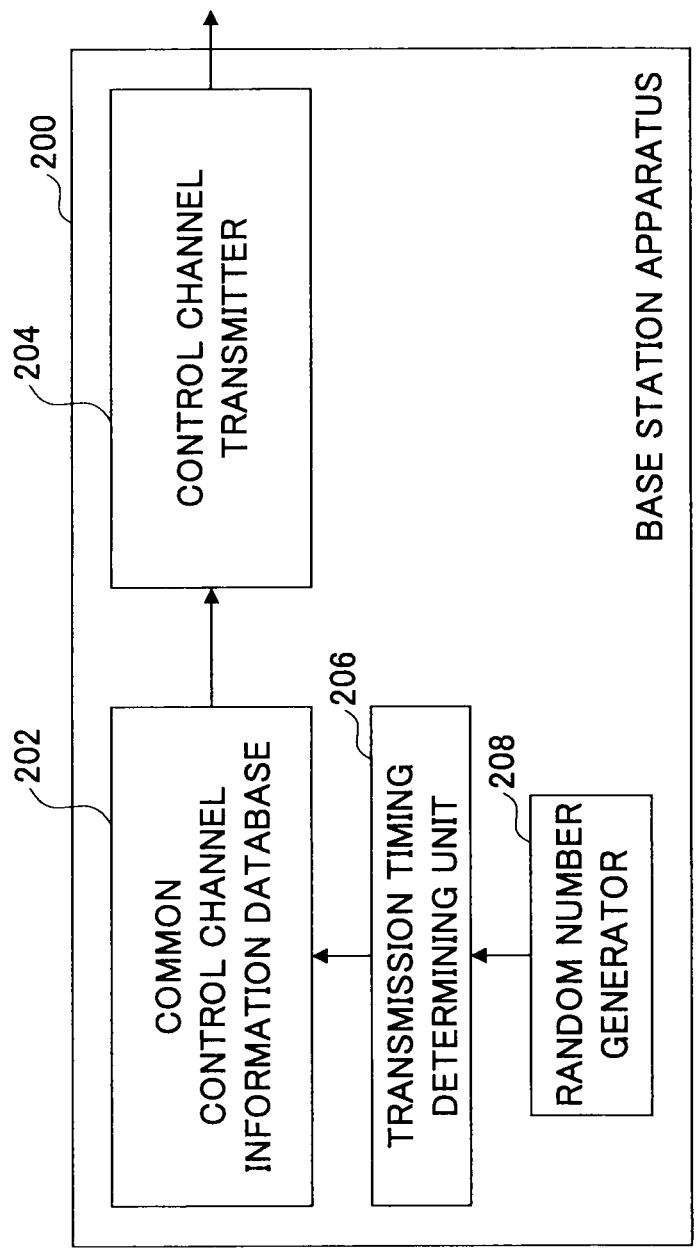
FIG. 6 is a partial block diagram illustrating a base station apparatus according to an embodiment.

A base station apparatus 200 according to the present embodiment is explained with reference to FIG. 6.

The base station apparatus 200 according to the present embodiment has a random number generator 208. The random number generator 208 generates a random number for randomizing a distribution order of control information. The random number generator 208 inputs a random number generated into a below-described transmission timing determining unit 206.

The base station apparatus 200 according to the present embodiment has a transmission timing determining unit 206. The transmission timing determining unit 206 determines an order of distribution of control information in each mesh included in a CPC Cell covered by the base station apparatus 200 based on the random number generated in the random number generator 208. According to the determined order of distribution, when a time of transmission in a mesh arrives, the transmission timing determining unit 206 inputs an identifier of a mesh distributed in into a below-described common control channel information database 202. The identifier of the mesh may include a mesh number.

The base station apparatus 200 according to the present embodiment has a common control channel information database 202. The common control channel information database 202 holds control information needed for communicating using a radio system within each mesh. The control information held therein may be minimally-required control information. The common control channel information database 202 inputs an applicable common control channel into a below-described control channel transmitter 204 based on a mesh identifier input.

The base station apparatus 200 according to the present embodiment has a control channel transmitter 204. The control channel transmitter 204 distributes a common control channel input.

Figure 7:
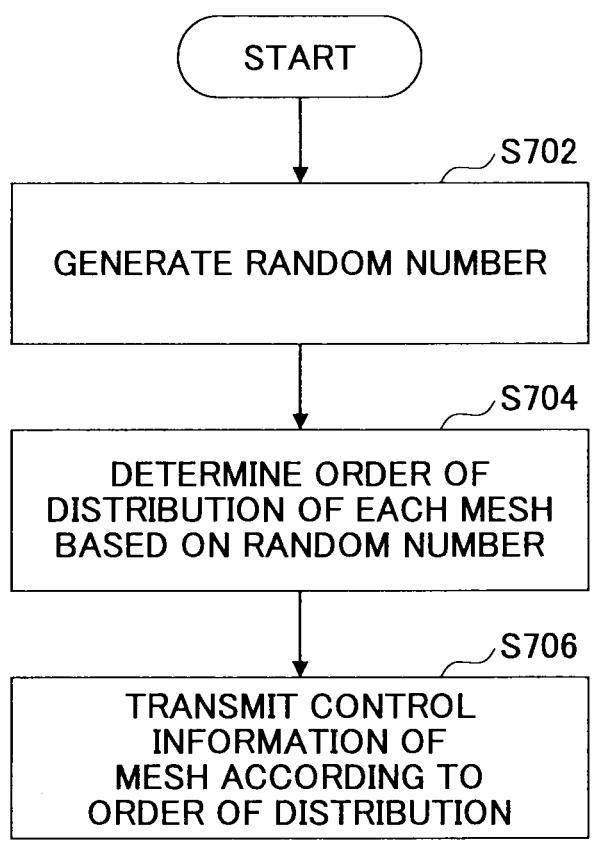
FIG. 7 is a flow diagram illustrating an operation of a base station apparatus according to an embodiment.

An operation of the base station apparatus 200 according to the present embodiment is explained with reference to FIG. 7.

The base station apparatus 200 generates a random number (step S702). For example, the random number generator 208 generates the random number. This random number may be a uniform random number, a normal random number, or a logarithmic normal random number.

Based on the generated random number, the base station apparatus 200 determines an order of distribution of each mesh (step S704). For example, the transmission timing determining unit 206 determines the order of distribution of each mesh based on the random number generated in the random number generator 208.

According to the order of distribution that is determined in step S704, the base station apparatus 200 transmits mesh control information (step S706). Based on the determined order of distribution, when an order of transmission in a mesh arrives, the transmission timing determining unit 206 informs of an identifier of a mesh to be distributed in to the common control channel information database 202. The common control channel information database 202 inputs control information of the mesh that corresponds to the identifier of the mesh to the control channel transmitter 204 based on the identifier of the mesh informed by the transmission timing determining unit 206. With a predetermined radio communications scheme, the control channel transmitter 204 modulates the mesh control information input and transmits the same.

A Second Embodiment

A communications system according to the present embodiment is similar to the communications system described with reference to FIG. 4.

A base station apparatus 200 according to the present embodiment changes transmission power of the control information according to a position of a mesh in which the control information is to be transmitted.

Figure 8:
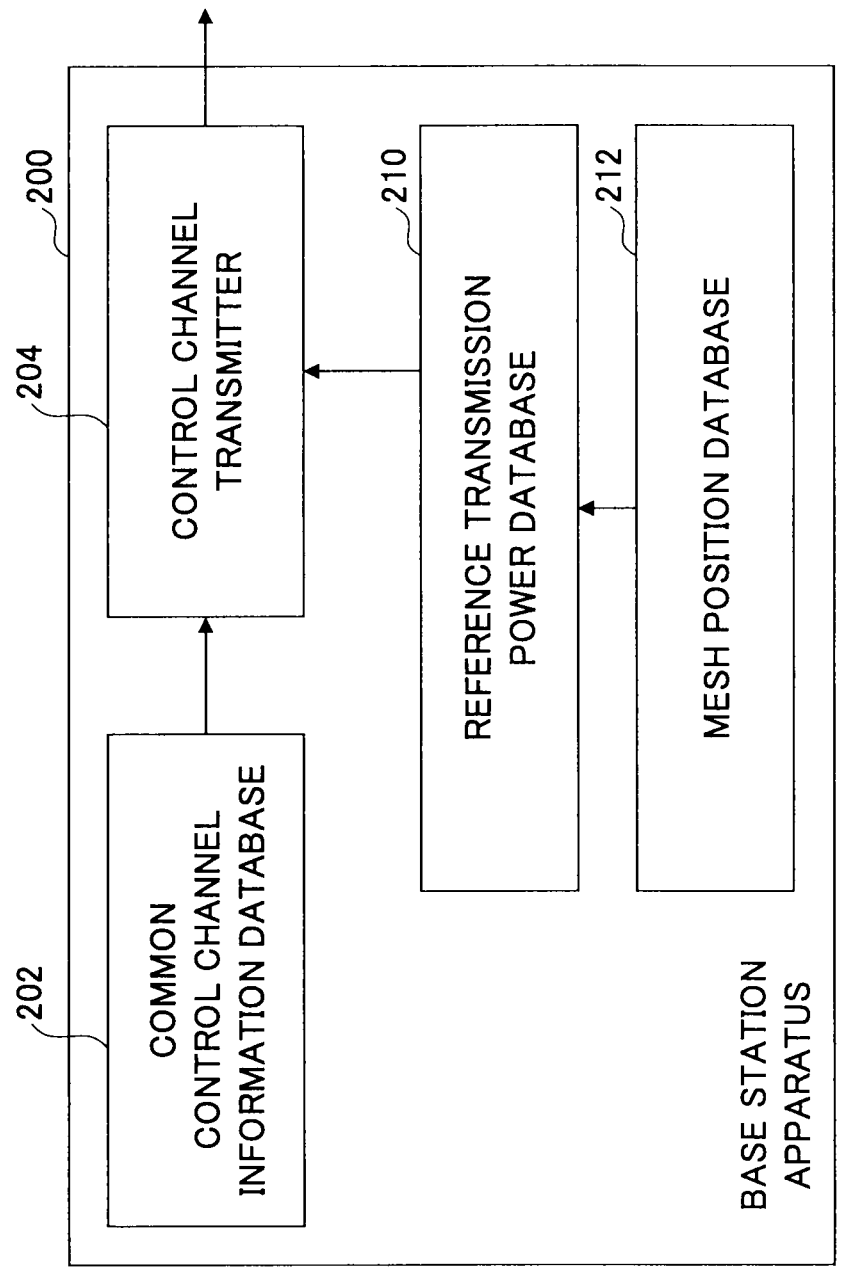
FIG. 8 is a partial block diagram illustrating a base station apparatus according to an embodiment.

The base station apparatus 200 according to the present embodiment is explained with reference to FIG. 8.

The base station apparatus 200 according to the present embodiment has a mesh position database 212. The mesh position database 212 holds a position of a mesh included in a CPC Cell covered by the base station apparatus 200.

The base station apparatus 200 according to the present embodiment has a reference transmission power database 210. The reference transmission power database 210 holds information indicating transmission power to be a reference in each mesh.

The base station apparatus 200 according to the present embodiment has a common control channel information database 202. The common control channel information database 202 holds control information needed for communicating using a radio system within each mesh. The control information held therein may be minimally-required control information. The common control channel information database 202 inputs the held control information into a below-described control channel transmitter 204.

The base station apparatus 200 according to the present embodiment has a control channel transmitter 204. The control channel transmitter 204 distributes control information according to transmission power held in the reference transmission power database 210.

Figure 9:
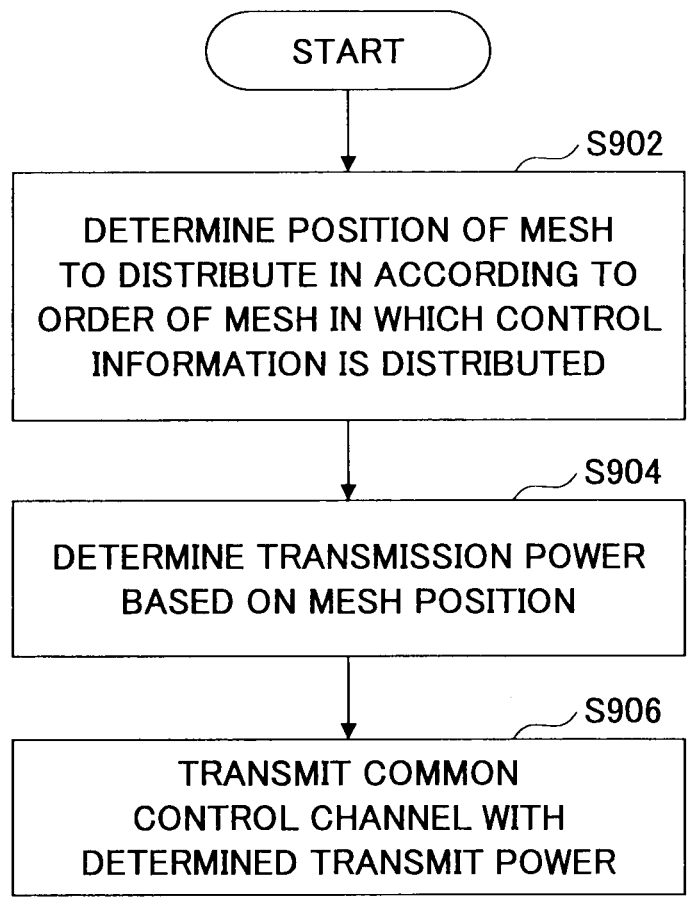
FIG. 9 is a flow diagram illustrating an operation of a base station apparatus according to an embodiment.

An operation of the base station apparatus 200 according to the present embodiment is explained with reference to FIG. 9.

In the present embodiment, an order of a mesh in which control information is transmitted is predetermined.

The base station apparatus 200 determines position information of a mesh to be distributed in according to an order of distribution of the mesh (step S902). For example, the mesh position database 212 determines position information of a mesh to be distributed in according to the order of distribution of the mesh. Then, the mesh position database 212 inputs position information of the mesh to be distributed in into the reference transmission power database 210.

Figure 10:
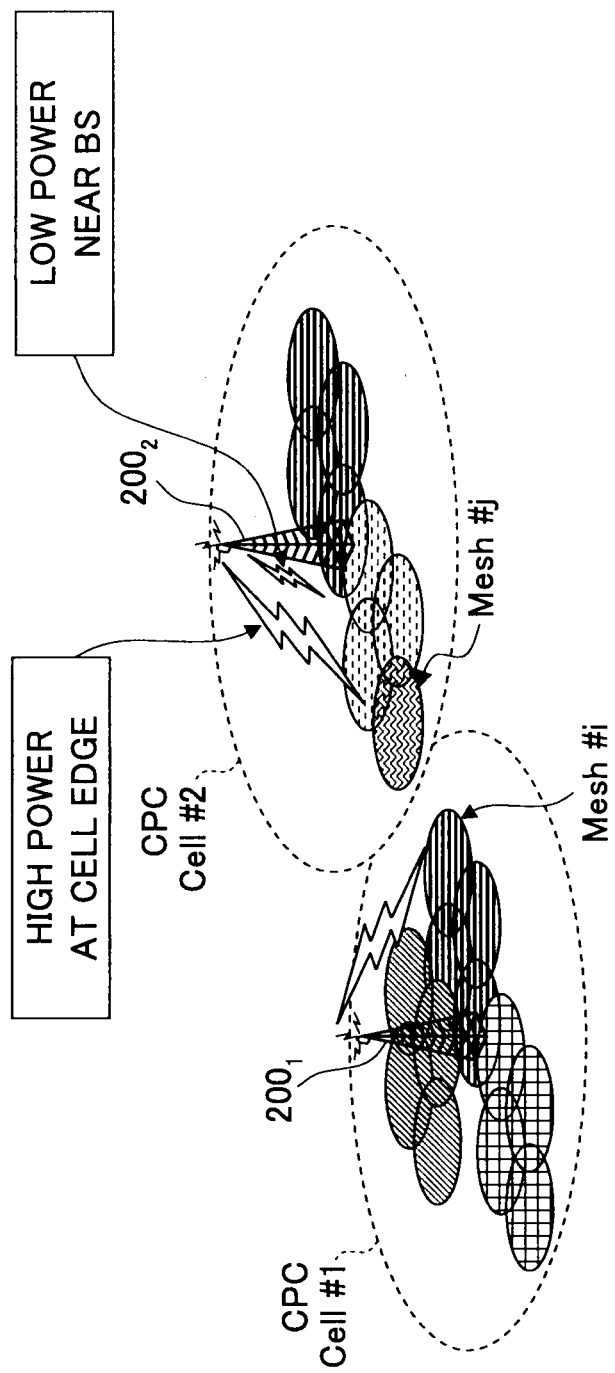
FIG. 10 is an explanatory diagram illustrating an operation of a base station apparatus according to an embodiment.

The base station apparatus 200 determines transmission power based on a position of the mesh determined in step S902 (step S904). For example, the reference transmission power database 210 determines transmission power corresponding to the position based on the mesh position information input. For example, the reference transmission power database 210 specifies transmission power corresponding to a mash included in a CPC Cell covered by the base station apparatus 200 according to a distance from the base station apparatus 200. For example, as shown in FIG. 10, a small transmission power is specified for a mash positioned close to the base station apparatus 200. Moreover, a large transmission power is specified for a mesh positioned far from the base station apparatus 200. This is merely exemplary, so that the transmission power corresponding to the mesh position may be changed as needed. The reference transmission power database 210 inputs information indicating transmission power into a control channel transmitter 204.

The base station apparatus 200 transmits a common control channel input by the common control channel information database 202 with transmission power determined in step S904 (step S906). According to a distribution order of a mesh, the common control channel information database 202 inputs the common control channel into the control channel transmitter 204. The control channel transmitter 204 transmits the input mesh control information with transmission power reported from the reference transmission power database 210.

Figure 11:
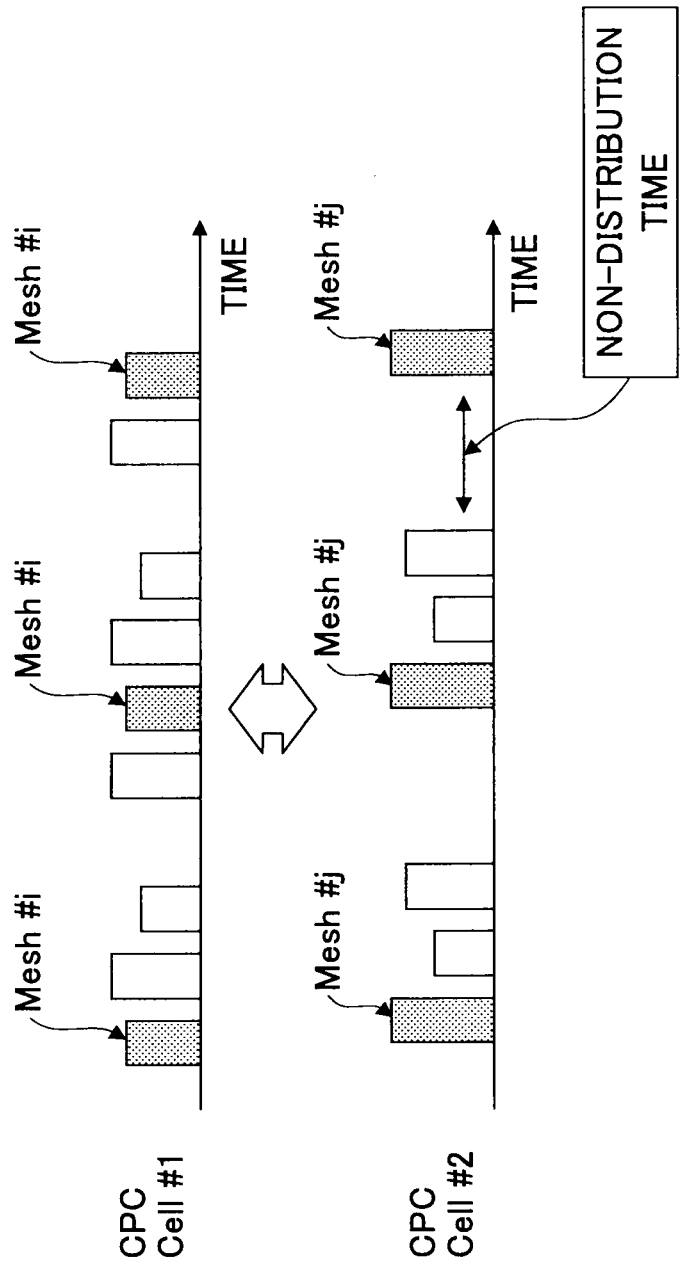
FIG. 11 is an explanatory diagram illustrating an operation of a base station apparatus according to an embodiment.

According to the present embodiment, transmission power may be varied for each mesh transmitted in. Thus, it is possible to control interference power according to the position of the mesh. FIG. 11 shows a relationship between reception timing and transmission power of each mesh. In FIG. 11, the vertical axis is transmission power and the horizontal axis is time.

According to the present embodiment, the transmission power of the control information differs even when reception timings overlap in neighboring meshes. Thus, interference may be reduced which control information received by the terminal apparatus is subjected to. Thus, control of reception quality of control information may be achieved, and improvement in reception quality may be achieved in the terminal apparatus.

A Third Embodiment

A communications system according to the present embodiment is similar to the communications system described with reference to FIG. 4.

The base station apparatus 200 according to the present embodiment changes transmission power of the control information according to a position of a mesh in which control information is transmitted. In this case, in the base station apparatus 200 according to the present embodiment, average transmission power is predetermined according to the position of the mesh. The base station apparatus 200 according to the present embodiment performs transmission power control based on the average transmission power.

Figure 12:
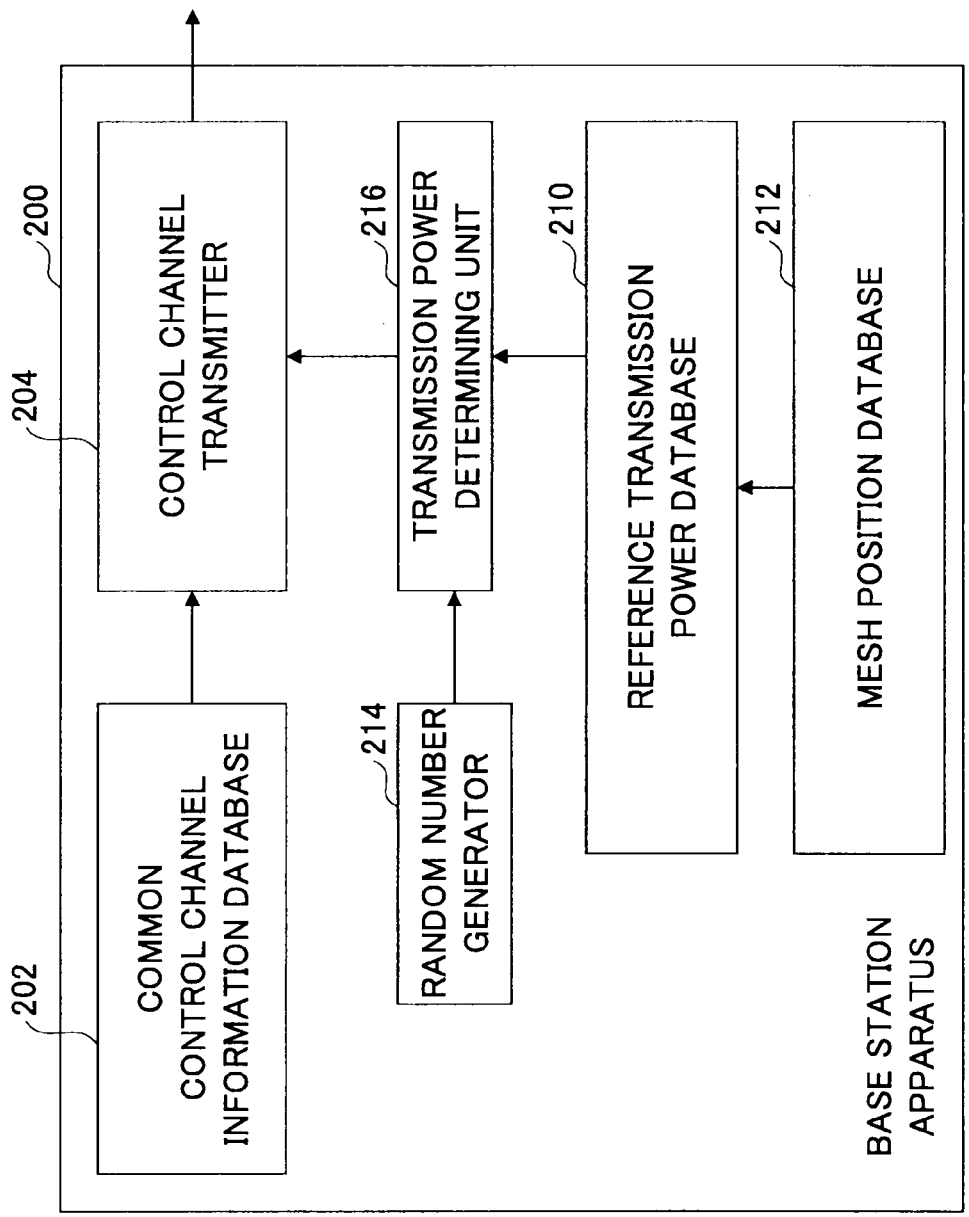
FIG. 12 is a partial block diagram illustrating a base station apparatus according to an embodiment.

The base station apparatus 200 according to the present embodiment is explained with reference to FIG. 12. The base station apparatus 200 according to the present embodiment has a random number generator 214 and a transmission power determining unit 216 in a base station apparatus 200, described with reference to FIG. 8.

The random number generator 214 generates a random number. This random number may be a uniform random number, a normal random number, or a logarithmic normal random number. The random number generator 214 inputs the generated random number into the transmission power determining unit 216.

The transmission power determining unit 216 determines transmission power of control information. For example, the transmission power determining unit 216 randomly controls transmission power of control information sets transmitted multiple times within a range of power with which the base station apparatus can transmit such that it becomes an average transmission power predetermined for each mesh based on the average transmission power. For example, based on the random number input, the transmission power determining unit 216 determines transmission power such that the above-described condition is met.

Figure 13:
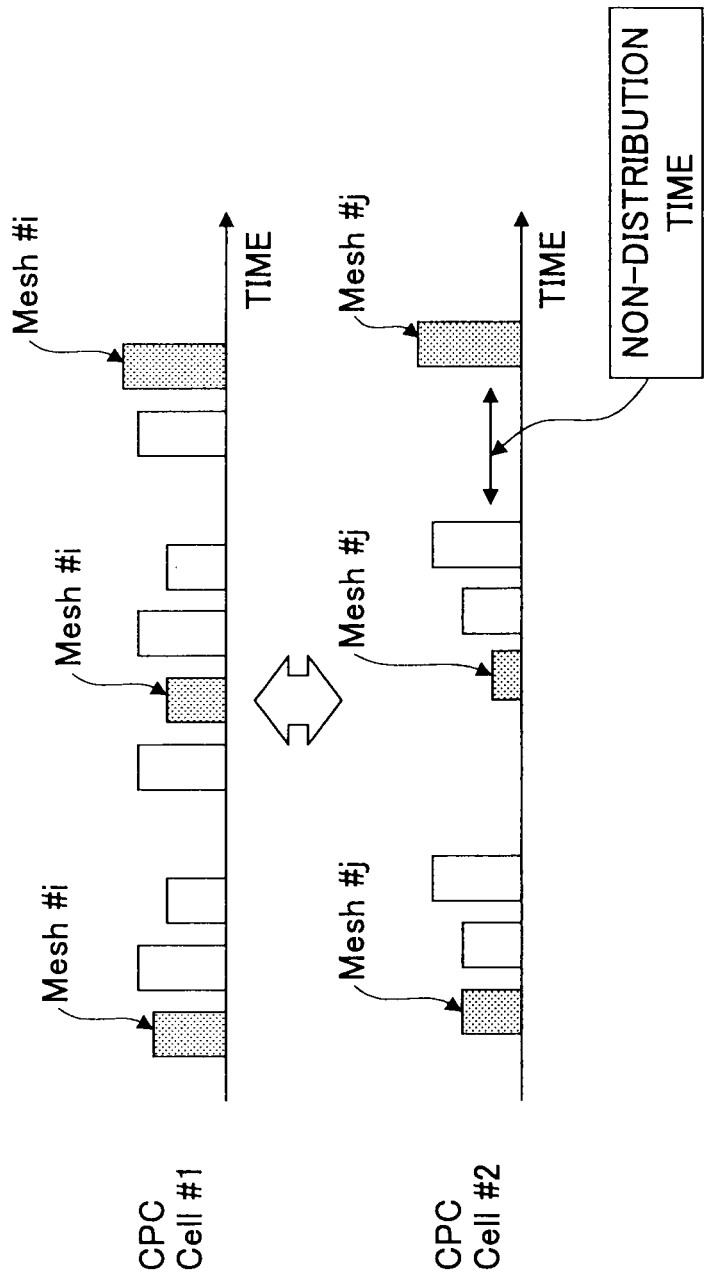
FIG. 13 is an explanatory diagram illustrating an operation of a base station apparatus according to an embodiment.

According to the present embodiment, transmission power of control information of each mesh may be changed for each time of transmission. Thus, effect of interference may always be varied, making it possible to improve the reception quality in the terminal apparatus. FIG. 13 shows a relationship between transmission timing and transmission power based on average transmission power determined by position of mesh to be distributed in. In FIG. 13, the vertical axis is transmission power and the horizontal axis is time.

A Fourth Embodiment

A communications system according to the present embodiment is similar to the communications system described with reference to FIG. 4.

The base station apparatus 200 according to the present embodiment randomizes an order of distribution of each mesh and controls transmission power based on a mesh position.

Figure 14:
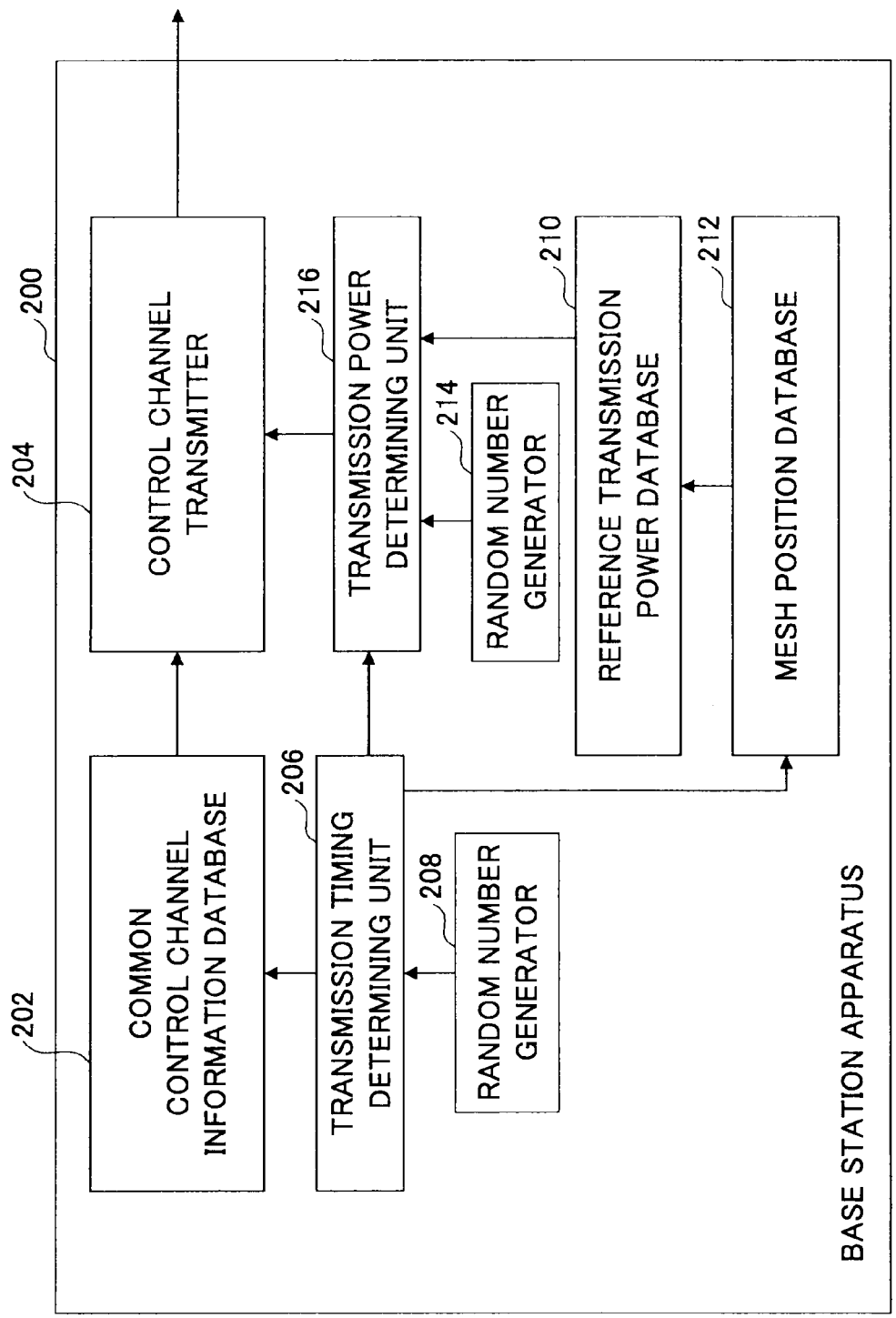
FIG. 14 is a partial block diagram illustrating a base station apparatus according to an embodiment.

As shown in FIG. 14, the base station apparatus 200 according to the present embodiment is a combination of a base station apparatus of the above-described first embodiment and a base station according to the third embodiment.

Figure 15:
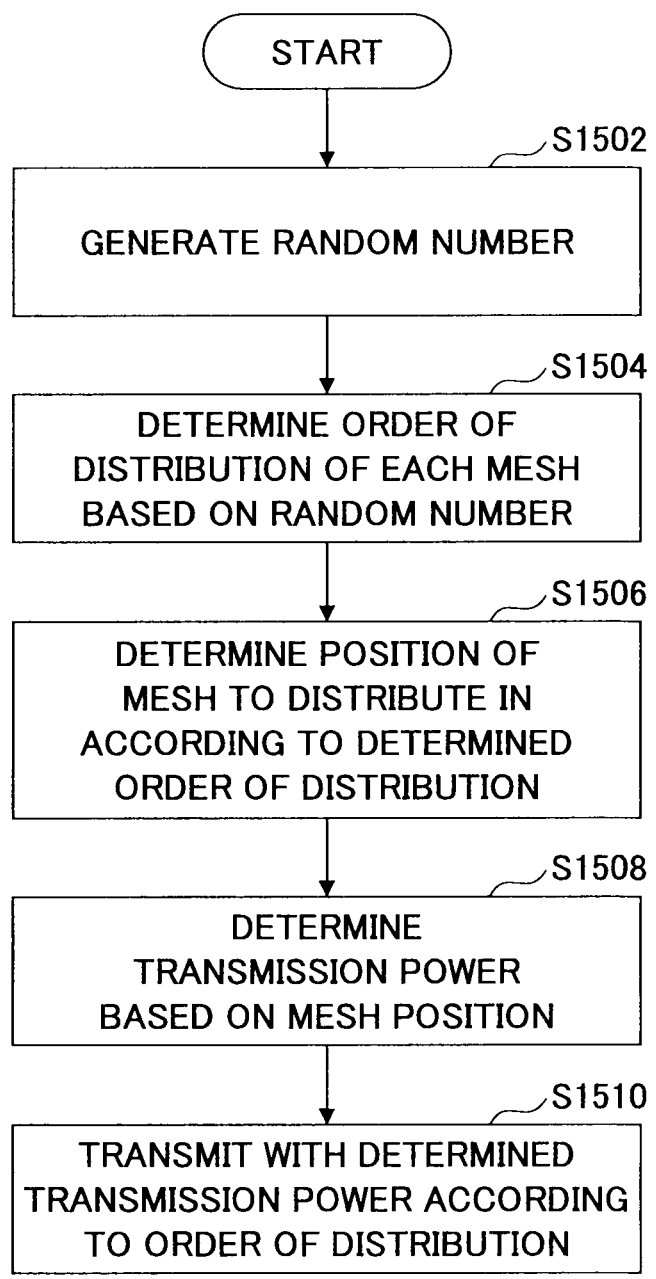
FIG. 15 is a flow diagram illustrating an operation of a base station apparatus according to an embodiment.

An operation of the base station apparatus 200 according to the present embodiment of the present invention is explained with reference to FIG. 15.

The base station apparatus 200 generates a random number (step S1502). For example, the random number generator 208 generates the random number.

Based on the generated random number, the base station apparatus 200 determines an order of distribution of each mesh (step S1504). For example, the transmission timing determining unit 206 determines the order of distribution in each mesh based on the random number generated in the random number generator 208.

The base station apparatus 200 determines position information of a mesh to be distributed in according to the order of distribution of the mesh that is determined in step S1504 (step S1506). For example, the mesh position database 212 determines position information of a mesh to be distributed in according to the order of distribution of the mesh. Then, the mesh position database 212 inputs position information of the mesh to be distributed in into a reference transmission power database 210.

The base station apparatus 200 determines transmission power based on a position of the mesh determined in step S1506 (step S1508). For example, the transmission power determining unit 216 randomly controls transmission power of control information sets transmitted multiple times within a range of power with which the base station apparatus can transmit such that it becomes an average transmission power predetermined for each mesh based on the average transmission power. For example, the transmission power determining unit 216 determines transmission power such the above-described condition is met based on the random number input.

According to the order of distribution that is determined in step S1504, the base station apparatus 200 transmits control information with the transmission power determined in step S1508 (step S1510).

Figure 16:
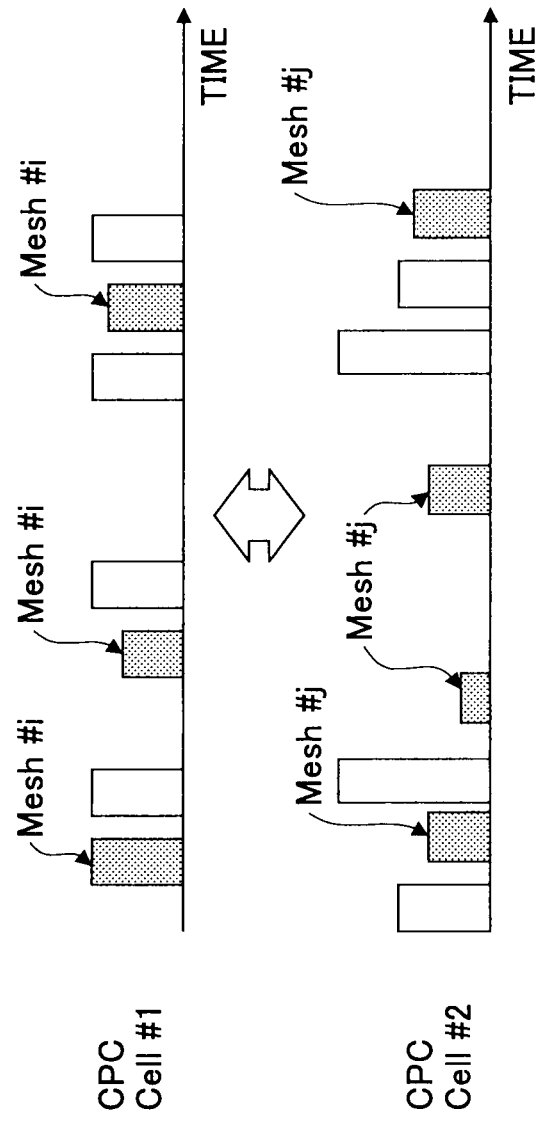
FIG. 16 is an explanatory diagram illustrating an operation of a base station apparatus according to an embodiment.

According to the present embodiment, an order of the mesh to be distributed in may be randomized. Moreover, based on average transmission power determined by a position of a mesh to be distributed in, a transmission power control may be performed. In FIG. 16, an example is shown of an operation for performing transmission power control based on a position of a mesh to be distributed in, and randomizing of an order of a mesh to be distributed in at the base station apparatus according to the present embodiment. In FIG. 16, the vertical axis is transmission power and the horizontal axis is time.

According to the present embodiment, an order of mesh to be distributed in may be randomized and transmission power at the time of a further distribution may be controlled using average transmission power based on the mesh position to reduce the effect of interference signal to a neighboring base station apparatus.

Moreover, it may be arranged for functionality of the base station apparatus according to the first embodiment and functionality of the base station apparatus according to the second embodiment to be combined. In this way, an order of a mesh to be distributed in may be randomized, and transmission power may be varied from one mesh to be transmitted in to another.

A Fifth Embodiment

A communications system according to the present embodiment is similar to the communications system described with reference to FIG. 4.

In a communications system according to the present embodiment, a base station apparatus $200_1$ and base station apparatus $200_2$ synchronize to distribute control information.

The base station apparatus $200_1$ and the base station apparatus $200_2$ are connected to the radio network controller 300. The radio network controller 300 synchronizes the base station apparatus $200_1$ and the base station apparatus $200_2$. The base station apparatus $200_1$ and the base station apparatus $200_2$ synchronize to transmit control information of each mesh.

Figure 17:
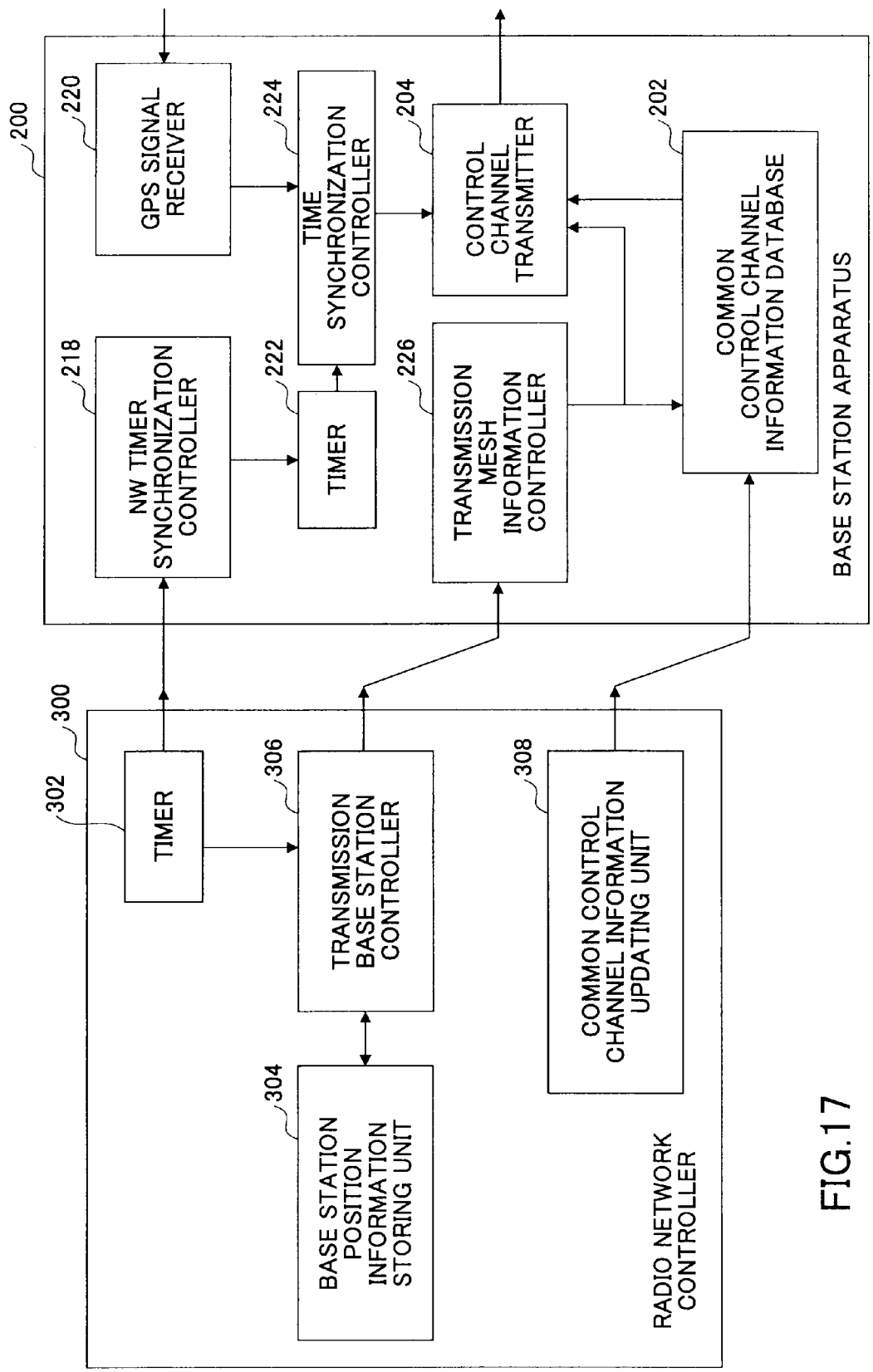
FIG. 17 is a partial block diagram illustrating a radio network controller and a base station apparatus according to an embodiment.

The radio network controller 300 according to the embodiment of the present invention is explained with reference to FIG. 17. For convenience of explanations, one base station apparatus 200 is shown in FIG. 17, but it may exist in multiple numbers.

The base station apparatus 300 according to the present embodiment has a timer 302. The timer 302 synchronizes the base station apparatuses to be controlled. Here, it is used to synchronize the base station apparatus $200_1$ and the base station apparatus $200_2$.

The radio network controller 300 according to the present embodiment has abase station position information storing unit 304. The base station position information storing unit 304 holds information on a position of a base station apparatus connected to the radio network controller 300.

The radio network controller 300 according to the present embodiment has a transmission base station controller 306. The transmission base station controller 306 controls each of the base station apparatuses 200 such that they are made to transmit in a synchronized manner.

The radio network controller 300 according to the present embodiment has a common control channel information updating unit 308. The common control channel information updating unit 308 manages and updates control information of a region held and maintained by all base station apparatuses controlled by the radio network controller 300.

A base station apparatus 200 according to the embodiment of the present invention is explained with reference to FIG. 17.

The base station apparatus 200 according to the present embodiment has a network (NW) timer synchronization controller 218. The NW timer synchronization controller 218 controls synchronization with other base station apparatuses based on timer information reported from the radio network controller 300.

The base station apparatus 200 according to the present embodiment has a timer 222. The timer 222 is held by the base station apparatus 200. The timer 222 is controlled by the network timer synchronization controller 218.

The base station apparatus 200 according to the present embodiment has a GPS signal receiver 220. The GPS signal receiver 220 receives a GPS signal for correcting for a delay which occurs in timer information reported from the radio network controller 300.

The base station apparatus 200 according to the present embodiment has a time synchronization controller 224. The time synchronization controller 224 performs time synchronization based on timer information input by the timer 222. Moreover, when a delay occurs in timer information reported from the radio network controller 300, the time synchronization controller 224 corrects for time synchronization based on a GPS signal input by the GPS signal receiver 220.

The base station apparatus 200 according to the present embodiment has a transmission mesh information controller 226. The transmission mesh information controller 226 performs control such that it distributes a transmission time reported from the radio network controller 300 as a control signal of the mesh. Moreover, the transmission mesh information controller 226 may perform control such that it distributes transmission power reported from the radio network controller 300 as a control signal of the mesh.

The base station apparatus 200 according to the present embodiment has a common control channel information database 202. The common control channel information database 202 holds a control signal of each mesh that is reported from the radio network controller 300 and the transmission mesh information controller 226.

The base station apparatus 200 according to the present embodiment has a control channel transmitter 204. The control channel transmitter 204 transmits control information.

Figure 18:
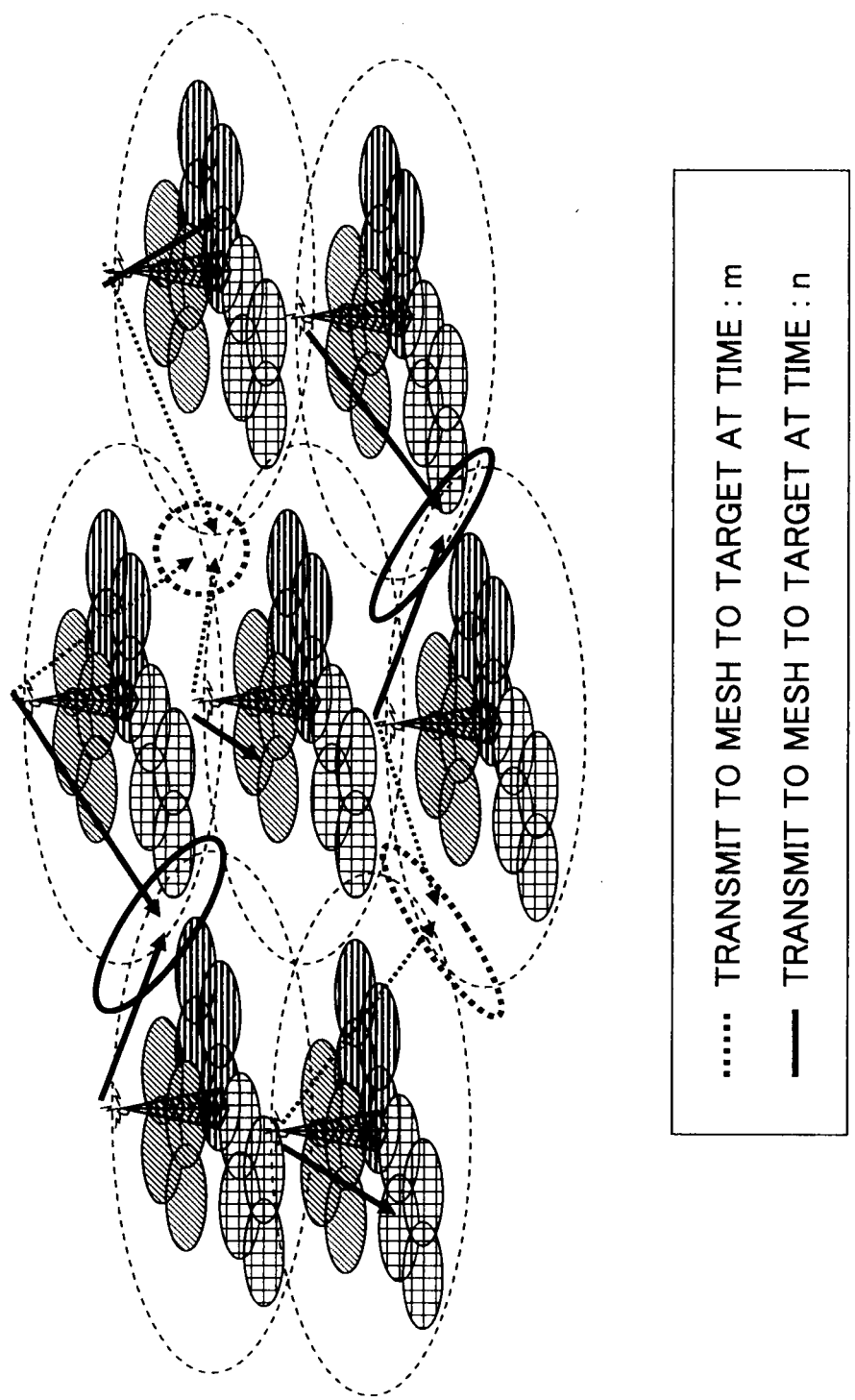
FIG. 18 is an explanatory diagram illustrating an operation of a base station apparatus according to an embodiment.

According to the present embodiment, when an order of distribution is randomized and control of transmission power for subsequent distribution is performed, the same control information is transmitted at the same transmitting time to a mesh which is considered to be difficult to secure reception quality also in a neighboring base station apparatus. For example, as shown in FIG. 18, for a mesh which overlaps a mesh distributed by the other base station apparatuses out of meshes distributed by each base station apparatus, a control is performed such that distribution timings are the same for a base station apparatus which covers the overlapping mesh. In this way, it is made possible for the terminal apparatus 100 to improve reception power of the control signal. Moreover, as control information of a different mesh is not distributed from a neighboring base station apparatus, the terminal apparatus 100 can remove an interference signal, making it possible to improve reception quality. Furthermore, the same applies to a combination of a base station apparatus described with reference to FIG. 17 and a base station apparatus described with reference to FIG. 6, FIG. 8, FIG. 12, or FIG. 14.

A Sixth Embodiment

A communications system according to the present embodiment is similar to the communications system described with reference to FIG. 4.

A terminal apparatus 100 according to the present embodiment is applied to all of the above-described embodiments.

Figure 19:
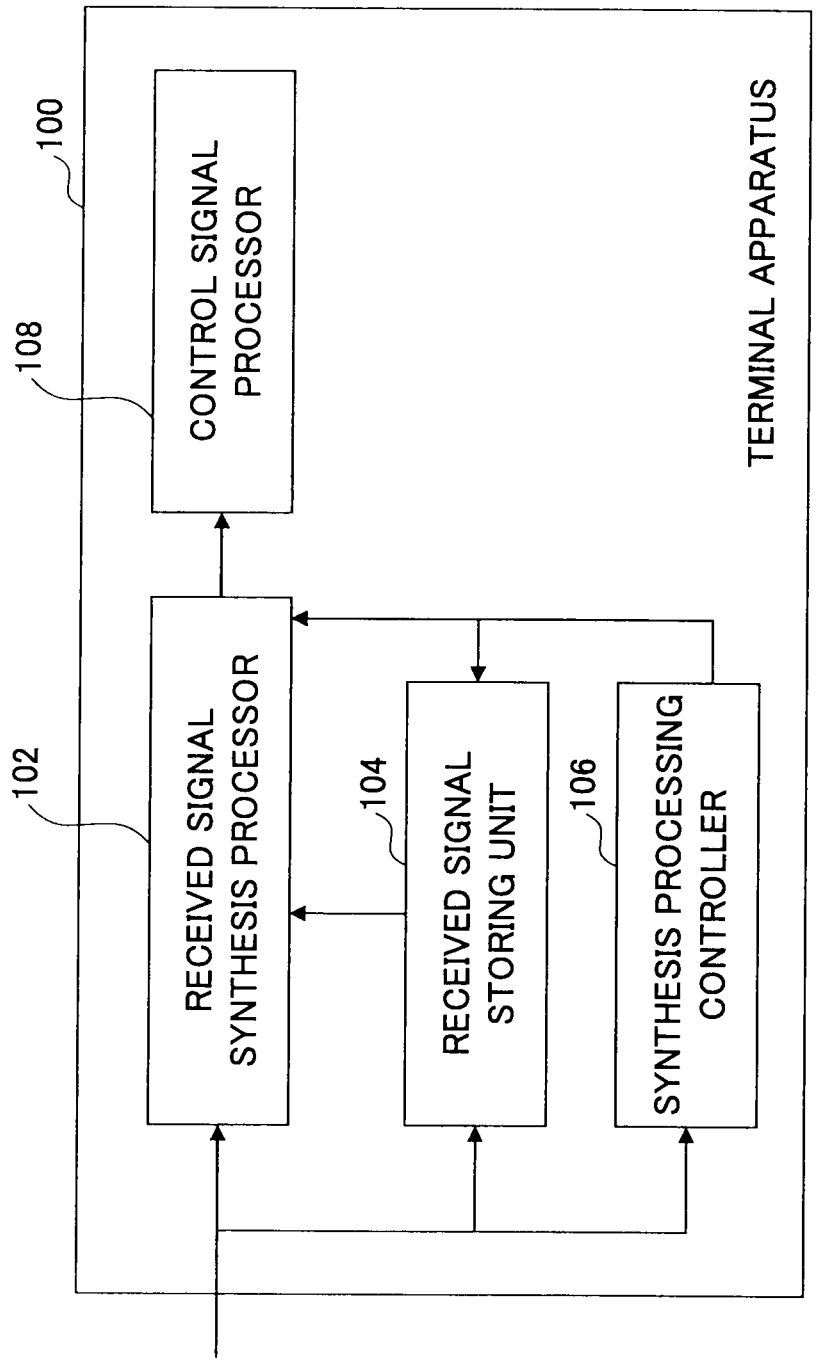
FIG. 19 is a partial block diagram illustrating a terminal apparatus according to an embodiment.

The terminal apparatus 100 according to the present embodiment is explained with reference to FIG. 19.

The terminal apparatus 100 according to the present embodiment has a received signal synthesis processor 102. The received signal synthesis processor 102 performs control for synthesizing control signals transmitted multiple times from a base station apparatus 200.

The terminal apparatus 100 according to the present embodiment has a received signal storing unit 104. The received signal storing unit 104 holds a signal received before performing the reception process.

The terminal apparatus 100 according to the present embodiment has a synthesis processing controller 106. The synthesis processing controller 106 synthesizes received signals.

The terminal apparatus 100 according to the present embodiment has a control signal processor 108. The control signal processor 108 performs control based on information of a radio system being operated in a mesh in which the terminal apparatus 100 resides.

In the radio communications system according to the present embodiment, control information of each mesh is transmitted multiple times with different distribution interval and/or transmission power. Therefore, in the terminal apparatus 100, different reception qualities are each time transmission is conducted. The terminal apparatus 100 preferably performs a synthesis process at the reception signal synthesis processor 102, taking into account that reception qualities are different. In this way, reception quality may be improved. This is because, by synthesizing received signals, it is likely to obtain reception quality of an environment with a small interference power at a transmission opportunity following too large interference power because of a different distribution order at a neighboring base station apparatus. Moreover, this is also because it is likely to obtain good reception quality with a large interference power from a distribution with high transmission power in the following order of distribution even when the transmission power is too low.

According to the base station apparatus of the present embodiment, an order of distribution of each mesh is randomized. For example, a mesh to be distributed in is randomly extracted, and control information of the mesh is distributed. In this way, a reception state may be made always different without providing the same interference signal to a terminal apparatus. For example, as a neighboring base station apparatus similarly distributes information of a different mesh, an interference signal becomes different when receiving at the terminal apparatus. As a result, reception quality may be improved in the terminal apparatus.

Moreover, according to a base station apparatus of the present embodiment, transmission power is determined based on a position of a mesh to be distributed in. In this way, an effect on a terminal apparatus of an interference signal transmitted from a neighboring base station apparatus may be reduced. For example, a transmission power at the time of distribution may be set such it is becomes power minimally receivable in a mesh to be distributed in. This is because, in order to transmit at a minimum power receivable within the mesh, transmission is not performed with excessive power, making it possible to make a signal to be interference to a neighboring region small. Moreover, for example, an average transmission power for each mesh is specified, and, within a range of power which is transmittable by the base station apparatus which meets the average value thereof, a transmission power of control information transmitted multiple times may be controlled randomly. By selecting transmission power randomly, it is possible, in a certain transmission time, to reduce an interference signal to a neighboring area. In particular, for transmitting the same signal multiple times as anticipated in the control signal this time, the probability of success of reception may be increased.

Furthermore, according to the base station apparatus of the present embodiment, conducting transmission power control based on a position of a mesh distributed and/or randomizing of an order of the mesh distributed in makes it possible in a terminal apparatus to reduce the probability of receiving information on a mesh required by the terminal apparatus simultaneously with a large interference signal successively.

Moreover, according to the base station apparatus of the present embodiment, control information of a part of the meshes is transmitted simultaneously in multiple base station apparatuses. In this way, for the terminal apparatus, an interference signal may be reduced and reception quality may be improved. For example, it may be arranged to distribute the same control signal at the same transmission time from a base station apparatus being operated in a neighboring region to a region in which ensuring of reception quality cannot be performed efficiently even for transmission based on maximum transmission power and high efficiency, such as an edge of a region each base station apparatus services. This is because distributing the same control signal at the same transmission time makes it possible to reduce interference power and to improve reception power. Moreover, transmission power control based on a position of a mesh to be distributed in and/or randomizing of an order of a mesh to be distributed in may be arranged to be performed simultaneously. For example, in order to distribute the same control signal at the same transmission time, the radio network controller which controls the base station apparatus controls transmission power and distribution time of meshes which are preferred to be transmitted in at the same time. Then, based on the above-described control, the radio network controller randomly selects, with respect to the base station apparatus, a distribution time for a mesh in which the same signal is not to be transmitted.

According to the terminal apparatus of the present embodiment, a control signal is distributed multiple times. Thus, not only a reception process of such a signal is performed for each of the distribution timings, but also signals received up to then may also be combined. The terminal apparatus makes it possible to obtain a time diversity effect and improve reception quality also by combining the signals received up to then.

For convenience of explanations, the present invention has been explained by breaking down into a number of embodiments; however, a breakdown of each embodiment is not essential, so that two or more embodiments may be used as needed. While specific numerical value examples are used to facilitate understanding of the present invention, such numerical values are merely examples, so that any appropriate value may be used unless specifically indicated otherwise.

As described above, while the present invention is described with reference to specific embodiments, the respective embodiments are merely examples, so that a skilled person will understand variations, modifications, alternatives, replacements, etc. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-131374 filed on May 19, 2008, the entire contents of which are hereby incorporated by reference.

The invention claimed is:

1. A base station apparatus, comprising:
   a transmitting unit to transmit control information, with a plurality of areas as units and each of the areas being a divided area that is divided from a coverage area;
   a storing unit to store control information corresponding to the divided areas; and
   a determining unit to randomly determine an order of distribution of the control information for each of the divided areas based on a generated random number, such that the order of the distribution of the control information to the divided areas is randomized each time the control information is distributed to the divided areas.

2. The base station apparatus as claimed in claim 1, further comprising:
   a control unit to control a transmission power of the control information based on a position of the divided area.

3. The base station apparatus as claimed in claim 1, further comprising:
   a synchronizing unit to synchronize with another base station apparatus, wherein
   the determining unit makes a determination such that a timing of distributing to a divided area which overlaps with the other base station apparatus becomes the same with a timing at which the other base station apparatus distributes to the overlapping divided area.

4. The base station apparatus as claimed in claim 1, wherein the control information includes control information for multiple radio communications systems being operated in the divided area.

5. The base station apparatus according to claim 1, wherein a time interval between subsequent distributions of a same control signal is changed to reduce a probability that a timing at which control information is transmitted to a first divided area overlaps within a timing at which control information is transmitted to a second divided area that neighbors the first divided area.

6. A base station apparatus, comprising:
   a transmitting unit to transmit control information, with a plurality of areas as units and each of the areas being a divided area that is divided from a coverage area;
   a storing unit to store control information corresponding to the divided areas; and
   a control unit to randomly control a transmission power of the control information based on a position of the divided area such that, for multiple transmissions of the control information, an average transmission power of the multiple transmissions is an average transmission power that is predetermined based on the position of the divided area.

7. The base station apparatus as claimed in claim 6, wherein the transmitting unit transmits the control information multiple times.

8. The base station apparatus according to claim 6, wherein the transmission power of control information of each area is changed for each time of transmission to vary an effect of interference.

9. The base station apparatus according to claim 6, wherein the control unit is to randomly control the transmission power of the control information based on a distance of the divided area from the base station such that, for multiple transmissions of the control information, the average transmission power of the multiple transmissions is the average transmission power that is predetermined based on the distance of the divided area from the base station.

10. A terminal apparatus in a communications system having a base station apparatus which transmits control information with areas as units, each area is a divided area that is divided from a coverage area, wherein the base station apparatus randomly determines a distribution order of the control information for the respective divided area based on a generated random number, such that the order of the distribution of the control information is randomized each time the control information is distributed, and transmits the control information multiple times, the terminal apparatus comprising:
 a storing unit which stores the control information that is transmitted multiple times; and
 a synthesizing unit which synthesizes the control information that is transmitted multiple times.

11. The terminal apparatus as claimed in claim 10, wherein the base station apparatus controls transmission power of the control information based on a position of the divided area.

12. A method for a base station apparatus which transmits control information, with a plurality of areas as units and each of the areas being a divided area that is divided from a coverage area, the method comprising the steps of:
 randomly determining an order of distribution for each of the divided areas based on a generated random number, such that the order of the distribution of the control information to the divided areas is randomized each time the control information is distributed to the divided areas; and
 transmitting the control information corresponding to the divided areas according to the randomly determined order of distribution.

13. A method for a base station apparatus which transmits control information, with a plurality of areas as units and each of the areas being a divided area that is divided from a coverage area, the method comprising the steps of:
 randomly controlling a transmission power of the control information based on a position of the divided area such that, for multiple transmissions of the control information, an average transmission power of the multiple transmissions is an average transmission power that is predetermined based on the position of the divided area; and
 transmitting the control information corresponding to the divided areas with the randomly controlled transmission power.

* * * * *